F. W. H. CLAY.
SOUND INDICATOR.
APPLICATION FILED OCT. 9, 1912.

1,145,554.

Patented July 6, 1915.

WITNESSES:

INVENTOR

F. W. H. Clay

UNITED STATES PATENT OFFICE.

FRANCIS W. H. CLAY, OF PITTSBURGH, PENNSYLVANIA.

SOUND-INDICATOR.

1,145,554.   Specification of Letters Patent.   Patented July 6, 1915.

Original application filed October 25, 1907, Serial No. 399,112. Divided and this application filed October 9, 1912. Serial No. 724,744.

*To all whom it may concern:*

Be it known that I, FRANCIS W. H. CLAY, a citizen of the United States, residing at Pittsburgh, in the State of Pennsylvania, have invented certain new and useful Improvements in Sound-Indicators, of which the following is a specification.

This application is a division of my previous application No. 399,112, filed October 25, 1907, for a method of recording sound; the primary object of the present invention being the elimination of accidental disturbances to sound diaphragms such as a phonograph recording and reproducing device, or a telephone.

Primarily it comprises means for maintaining a diaphragm intended to be moved by sound waves, in a continual state of vibration, above the limits of audibility, for various purposes hereinafter set forth.

I have herein illustrated the invention as applied to telephones and phonographs.

Figure 1:
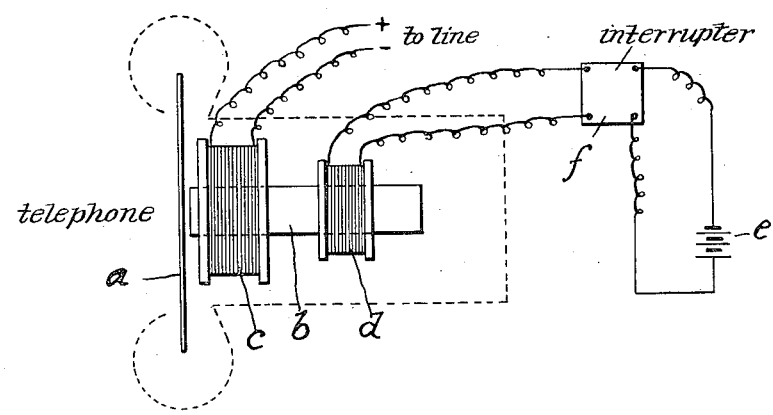
Figure 2:
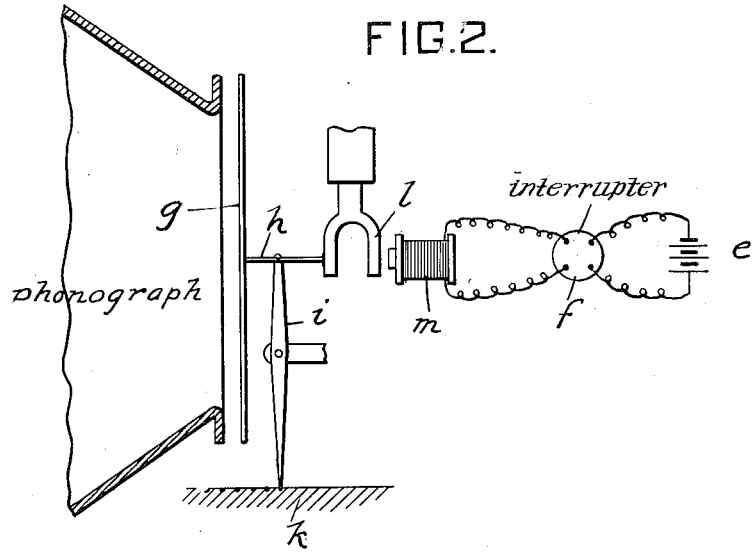

In the accompanying drawing Figure 1 is a diagram and partial side elevation showing a telephone receiver diaphragm supplied with my invention. Fig. 2 illustrates the application of the invention to a phonograph recorder or reproducer.

The principal cause of impure tones in telephones and phonographs, is the superimposition upon the regular wave form, of irregular subsidiary movements without particular order. Suppose a telephone receiver for example, is vibrating in response to a series of undulations in the current through its coils of a frequency of 500 per second; the diaphragm would have a perfectly regular swinging movement and it would produce a pure fundamental tone. In the course of its excursion to and fro in making this movement, if it is affected by any other variation in the electric current, or any accidental sound wave from outside, this interferes with the regularity of its movement. The theory upon which my invention is based is substantially that if the diaphragm is meantime enforced to vibrate to a small degree at a very high frequency, it will be in condition of greater sensitiveness to larger sound waves on account of its unstable condition and will also on account of its momentum due to the smaller inaudible movements, be more difficult to disturb by instantaneous accidental impulses.

In Fig. 1, I represent a telephone receiver of which $a$ is the vibrating iron diaphragm held close to the magnet $b$ and its position varied in accordance with speech transmitted over the line by reason of variations in the electric current in the coils $c$ surrounding the magnet. I supply an additional coil $d$, which by means of any source of electric energy, either an alternator or the battery $e$ and interrupter $f$ as shown, varies the magnetism of the bar $b$ with the periodicity so high that the resulting effect on the diaphragm $a$ cannot be heard; for instance above 20,000 or 30,000 per second.

In Fig. 2, I have indicated an instrument which may be either a phonographic recorder, or a phonographic reproducer, of which $g$ is the vibrating diaphragm, moved by, or creating sound waves, as the case may be. It is connected by the bar $h$ to the lever arm $i$ whose point engages the moving surface $k$. Also the bar $h$ is attached to a tuning fork $l$ or any other device, which is kept in constant vibration, as for example by the electromagnet $m$, energized by battery $e$ and interrupter $f$. In the case of a recorder, the lever $i$ is cutting its way through the moving recording surface $k$, making a lateral sinuous groove. Inasmuch as in its motions, the small vibrations above the limits of audibility will accomplish the work of pushing the graving tool through the wax or other material, the motion due to the sound wave impinging on diaphragm $g$ will not be opposed by resistance of the lever $i$ in moving through the wax. Neither will there be introduced any error on account of the bending of the lever $i$, or looseness of joints. Conversely in case of reproducing sound, the diaphragm $g$ being kept in constant motion at high frequency either by the instrument $l$, or by reason of minute undulations on the rim of the record continually moving the lever $i$, (as described in my parent application) the diaphragm $g$ will be moved with ease by the larger sound waves and will therefore give off a pure tone or overtone.

By the means above described, disturbing noises are in large measure suppressed, because it is more difficult to apply an irregular movement to a regularly moving body than it would be to apply an irregular movement to a body which is stationary. Meanwhile, the vibrating diaphragm will respond more faithfully to the sound wave impulses, because being already in motion there is no initial inertia to overcome. In other words, the larger sound wave movement is added to or impressed upon the smaller inaudible movement and the diaphragm is already in the condition in which it is more sensitive to regular and orderly movements, than it is to irregular and disorderly movements. The result is to increase the sensitiveness of the sound recording or reproducing instrument.

Having thus described my invention and illustrated its use, what I claim is:

1. The combination with an instrument having a vibratory diaphragm adapted to vibrate in accordance with sound waves, of a supplementary vibrating device entirely independent of the source of the sound wave vibration, continually maintaining such diaphragm in regular vibration with a frequency above the limits of audibility, to increase sensibility and suppress noise.

2. The combination with a transmitting or receiving telephone diaphragm, of a supplementary device entirely independent of the source of the sound wave vibrations, adapted to continually maintain the diaphragm in a state of vibration at a frequency above the limit of audibility whereby to increase sensibility.

3. The combination of a telephone diaphragm, means to vibrate the diaphragm with the frequency of sound waves and an entirely independent supplementary vibrator continually maintaining the diaphragm in motion at a frequency above the limits of audibility.

4. A telephone receiver comprising a disk and an electromagnet to actuate the disk, and a supplementary coil on said magnet, and means to excite said coil with impulses of a frequency above the limits of audibility, substantially as described.

In testimony whereof I have hereunto signed my name in the presence of the two subscribed witnesses.

FRANCIS W. H. CLAY.

Witnesses:
FRED'K STAUB,
Jo. BAILY BROWN.